United States Patent [19]
Miller

[11] 3,710,653
[45] Jan. 16, 1973

[54] EYEGLASS FRAME ALIGNMENT DEVICE

[76] Inventor: Bernard H. Miller, 141 North Dickson Street, Michigan City, Ind.

[22] Filed: April 14, 1971

[21] Appl. No.: 133,984

[52] U.S. Cl. .....................81/3.5, 269/237, 269/289, 72/390
[51] Int. Cl. ...............................................B25b 11/00
[58] Field of Search .........81/3.5; 269/237, 289, 156, 269/238; 72/389, 390

[56] References Cited

UNITED STATES PATENTS 2,684,002  7/1954  Horvath ..................................81/3.5
3,577,811  5/1971  Walker....................................81/3.5

Primary Examiner—Robert C. Riordan
Assistant Examiner—Roscoe V. Parker, Jr.
Attorney—Hobbs & Green

[57] ABSTRACT

An eyeglass frame alignment device having two vertical posts mounted on a base forming a space therebetween and a third post connected pivotally to the base and rigidly to a lever. A screw in the lever tilts the third post angularly toward and away from the vertical posts to clamp the eyeglasses between the pair of posts and the third post to apply firm pressure against the front member and bridge of the glasses and to hold the glasses firmly in place for a period of time to realign the front member and to obtain a relatively permanent set in the realignment.

7 Claims, 4 Drawing Figures

PATENTED JAN 16 1973

INVENTOR.
BERNARD H. MILLER
BY Hobbs & Green
ATTORNEYS

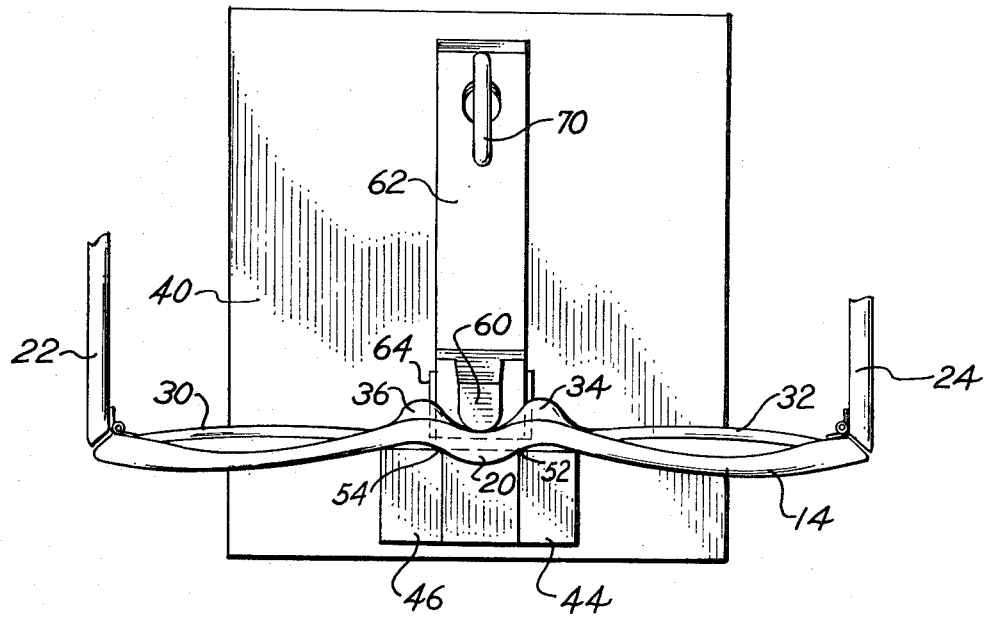
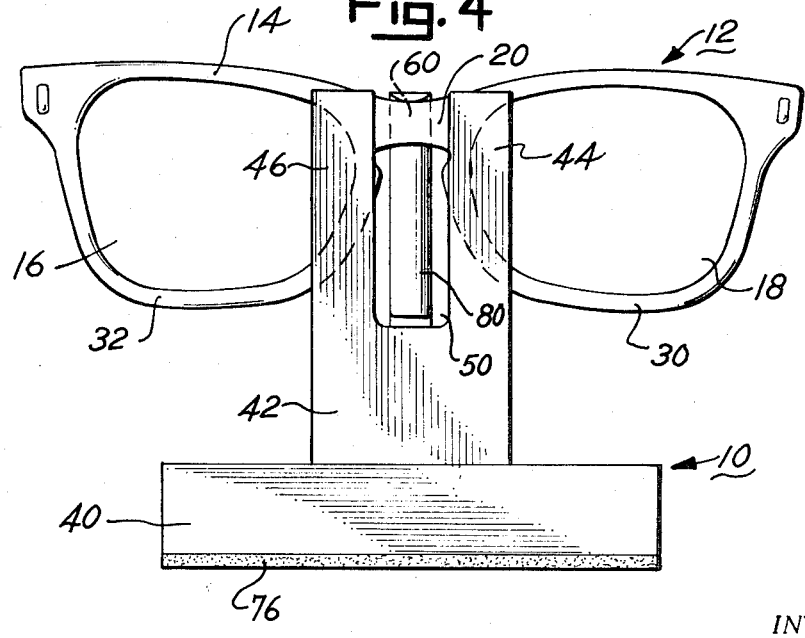

EYEGLASS FRAME ALIGNMENT DEVICE

The widely used convention plastic eyeglass frames warp out of shape from the body heat of the wearer, particularly at the nose or bridge piece, permitting the lens frames to bow slightly forwardly and the temple pieces to spread outwardly. This results in a loose fit of the frames and temple pieces, which permits the frames to slip down the nose, causing discomfort and distorted vision through the lens. In normal use and practice, this loosening condition continues to worsen until it becomes necessary to take the glasses to a technician for adjustment and refitting. Since a technician is frequently not readily available, the wearer often tolerates the discomfort and distorted vision for substantial periods of time, often until he returns to the eye specialist for an examination. It is therefore one of the principal objects of the present invention to provide a device for aligning plastic frames of eyeglasses at frequent intervals so that they will be maintained in substantially their true aligned and properly fitted condition at all times.

Another object of the invention is to provide an eyeglass frame alignment fixture which is relatively simple in construction and operation, and can be easily used when the glasses are removed for sleeping and other short periods of time, and which can apply prolonged moderate pressure to the frames at room temperature without danger of breaking or otherwise damaging the frames or lens.

Still another object of the invention is to provide an eyeglass frame alignment fixture which is so constructed and designed that it will accommodate various sizes and shapes of plastic frames, and apply the proper pressure to the frame to realign and adjust the frame within a period of several hours, and which can readily be carried on trips in conventional luggage and the like.

A further object is to provide a fixture for aligning plastic eyeglass frames, which reshapes the frames while serving as an effective holder or retainer and protector for the glasses while they are not being worn, and which does not require the application of heat from an external source or the use of any tools or instruments in the aligning and adjusting operation.

Additional objects and advantages of the invention will become apparent from the following description and accompanying drawings, wherein:

FIG. 3 is a top plan view of the eyeglass frame alignment fixture; and

FIG. 4 is a front elevational view of the fixture.

Figure 1:
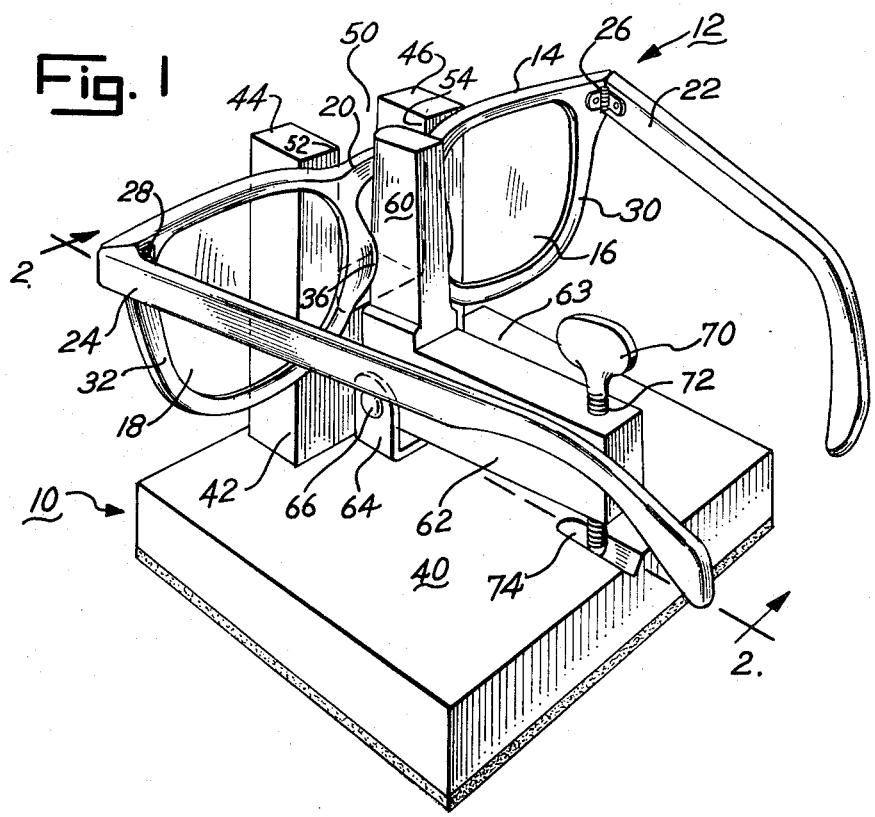
FIG. 1 is a perspective view of the present eyeglass frame alignment fixture, with a pair of glasses shown therein in position for correction.
Figure 2:
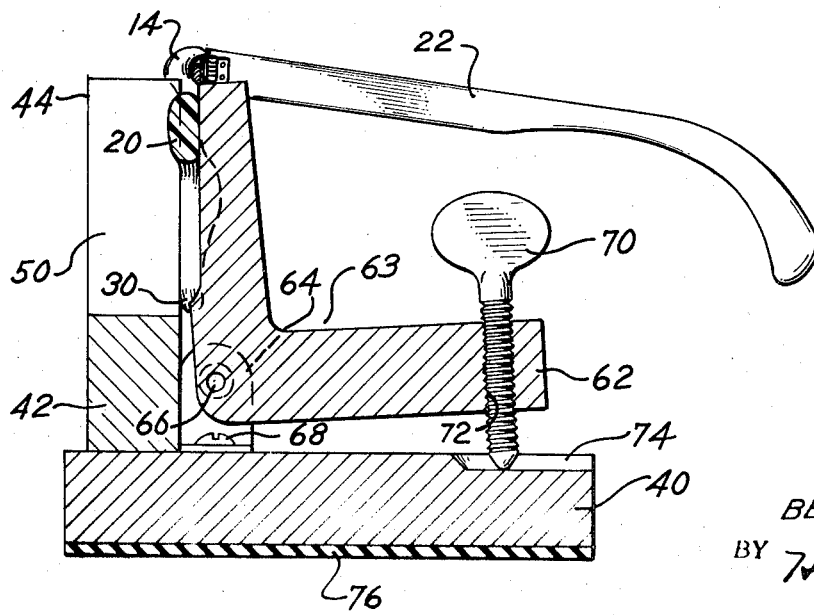
FIG. 2 is a vertical cross sectional view of the fixture for eyeglasses shown in FIG. 1, the section being taken on line 2—2 of FIG. 1.

Referring more specifically to the drawings, numeral 10 designates generally the present eyeglass frame alignment fixture, and 12 a pair of conventional or standard eyeglasses constructed of a plastic material and having a front member 14, lens 16 and 18, bridge 20, and temples 22 and 24 pivotally connected to the outer ends of front member 14 by the hinges 26 and 28. Frames 30 and 32 extend around the sides and lower edge of lens 16 and 18 and are joined integrally with front member 14 to form a unitary structure. The bridge 20 is likewise formed as an integral part of front member 14. Mounted on and forming a part of frames 30 and 32 are rests 34 and 36.

When the eyeglasses are initially adjusted, they are normally fitted by heating and bending or twisting the frame until the proper fit is obtained on the wearer's nose and the temples are properly fitted to the wearer's ears, so that a relatively snug or firm fit is obtained which prevents the frame from slipping down the wearer's nose or otherwise becoming displaced during normal activities by the wearer. However, as a result of putting on and taking off the glasses and cleaning them from time to time, the bridge 20 and/or the front member 14 may become somewhat distorted by bending forwardly and outwardly so that the outer corners may be slightly forward from their proper position. This bending forwardly at the bridge causes the temples likewise to move angularly outwardly, loosening the temples behind the wearer's ears and along each side of his head, thus causing the previously mentioned looseness of the eyeglasses and the tendency of the glasses to slip down the wearer's nose or otherwise become displaced. In the past this misalignment has been corrected solely by a technician, who heats the plastic frames and bends the frames to their original position to obtain the proper fit. This, however, is often inconvenient for the wearer, and as a result, often not done for substantial periods of time. The present eyeglass alignment fixture eliminates the need for the special services of a technician, and permits frequent correction of the misalignment with little trouble or inconvenience to the wearer.

The eyeglass frame alignment fixture 10 consists of a base 40, having an upright 42, with two spaced posts 44 and 46 defining a slot 50 extending downwardly from the top, but spaced from the bottom of the upright. The inner corners 52 and 54 are preferably rounded throughout their height, since the front side of the frame of the glasses seats firmly on the adjacent side of the upright and normally engages the inner corners of the two posts, as seen in FIG. 3. A movable post 60 of somewhat lesser width than slot 50 is adapted to be moved toward and away from the slot by a lever 62 on which post 60 is rigidly mounted, or which is formed integrally with post 60. The post and lever 62 form an L-shaped element, the end adjacent upright 42 being pivoted to base 40 by a bracket 64 and pin 66, the bracket being rigidly secured by screws or other suitable securing means to the upper surface of base 40.

The movable post 60 is moved angularly inwardly toward slot 50 by a thumb screw 70 threadedly received in an opening 72 in the outer end of lever 62. The lower end of the screw seats on the upper surface of base 40, preferably in a guide slot 74 in the upper surface of the base. The slot assists in giving stability to the movement of element 63 when post 60 is being moved forwardly to clamp the front member and bridge of the eyeglass frames against posts 44 and 46.

The base 40, upright 42 and element 63 may be made of any suitable material such as plastic, wood or metal, or any combination of those materials, and a cushion 76 of rubber or felt is preferably secured to the underside of the base 40. Upright 42 may be formed integrally with the base or, as shown in the drawings, formed as a separate piece and secured thereto by screws, pins, or cement, which will permanently and rigidly secure the upright to base 40.

In the use of the present eyeglass alignment fixture, the thumb screw is rotated in the direction to withdraw movable post 60 from the two stationary posts 44 and 46 and slot 50. The eyeglasses are then mounted in the fixture with the nose piece positioned in direct contact with movable post 60 and with the front surface of front member 14 seated against the rear surface of posts 44 and 46. Post 60 is tapered upwardly and rearwardly along the front surface 80 to permit element 63 to readily accommodate frames having various thicknesses of bridges and front frames. The glasses with the thicker bridges and front frames will normally be positioned somewhat higher along the vertical area of the three posts. After the eyeglasses have been assembled in the manner illustrated in the drawings, thumb screw 70 is tightened sufficiently to cause post 60 to press the bridge forwardly and the front member 14 firmly against posts 44 and 46. The tightening of screw 70 is continued until the front piece 14 has been bent sufficiently to return the outer corners thereof to their original position relative to the bridge, i.e., normally substantially on a straight line from one corner to the other corner and intersecting the center of the bridge. The glasses then remain clamped in the fixture in the foregoing manner with the necessary pressure being applied to the bridge by movable post 60 and are held in the clamped condition for a period of time such as overnight, thus causing a relatively permanent set in the frame in its realigned condition. When the glasses are to be used, thumb screw 70 is loosened, causing movable post 60 to tilt rearwardly and relieve the pressure on bridge 20, and thus releasing the gripping action of the three posts on the glasses frame. The glasses then can easily be lifted from the fixture.

The present eyeglass frame alignment fixture is of a size which can readily be carried in luggage and used on a desk, night stand or dresser, so that it is always readily available to realign and reshape the glasses to their original fitted condition. The parts of the fixture may be of a variety of different colors to fit the decor of the room in which the fixture is normally used.

While only one embodiment of the present eyeglass frame alignment fixture has been described in detail herein, various changes and modifications may be made to satisfy requirements without departing from the scope of the invention.

I claim:

1. An alignment device for a pair of glasses having a front member with a bridge, comprising a base, a means including a pair of spaced vertical posts extending upwardly from said base and defining a slot between said posts, a means including a third post substantially parallel with said pair of posts and positioned on a horizontal center line of the space between said pair of posts for engaging the bridge, and means for pivoting one of said means angularly on a vertical plane relative to the other of said means to clamp the bridge and front member therebetween for bending the outer ends of said front member rearwardly with respect to said bridge and retaining the front member in the realigned position.

2. An alignment device for a pair of glasses as defined in claim 1 in which said pair of spaced posts are secured rigidly to said base and said third post includes means for moving said post angularly on a vertical plane toward and away from the upper part of said pair of posts.

3. An alignment device for a pair of glasses as defined in claim 2 in which said third post is rigidly secured to a lever and a means pivotally attaches said lever to said base near said third post.

4. An alignment device for a pair of glasses as defined in claim 2 in which said means for moving said pair of posts and third post relative to one another consists of a screw for moving said third post angularly with respect to said pair of posts.

5. An alignment device for a pair of glasses as defined in claim 4 in which said screw extends downwardly through said lever and engages said base for tilting said lever upwardly and said third finger angularly with respect to said pair of posts.

6. An alignment device for a pair of glasses as defined in claim 1 in which said third post is tapered upwardly and rearwardly on the side thereof generally facing said pair of posts for receiving eye glasses having bridges of different thicknesses.

7. An alignment device for a pair of glasses as defined in claim 1 in which said pair of posts and said third post form the only members engaging the pair of glasses when they are clamped therebetween.

* * * * *